Feb. 20, 1962 J. F. FLOOD 3,021,842
HYPODERMIC NEEDLE GUIDE
Filed Nov. 5, 1958

INVENTOR
JOHN F. FLOOD,
BY Hall + Houghton
ATTORNEYS

3,021,842
HYPODERMIC NEEDLE GUIDE
John F. Flood, 1383 Cosgrove St., Watertown, N.Y.
Filed Nov. 5, 1958, Ser. No. 771,997
5 Claims. (Cl. 128—215)

This invention relates to surgical apparatus and more particularly to a device for orienting and guiding a cannula, needle, or the like.

In certain types of surgery, it is desirable to insert a cannula or the needle of a hypodermic syringe into a chosen region of the body. It is sometimes necessary to orient the cannula or needle precisely with respect to an organ into which it is to be inserted. This is especially true in neurosurgery. Prior to the present invention it has been very difficult to ensure proper orientation.

It is accordingly a principal object of the invention to provide a novel device for orienting and guiding a cannula, needle, or the like with respect to a living body.

Another object of the invention is to provide a device of the foregoing type that is simple to manufacture and to use.

An additional object of the invention is to provide a device of the foregoing type which may be precisely and positively set.

The foregoing and other objects, advantages, and features of the invention and the manner in which the same are accomplished will become more readily apparent upon consideration of the following detailed description of the invention when taken in conjunction with the accompanying drawings, which illustrate a preferred and exemplary embodiment and wherein.

Figure 1:
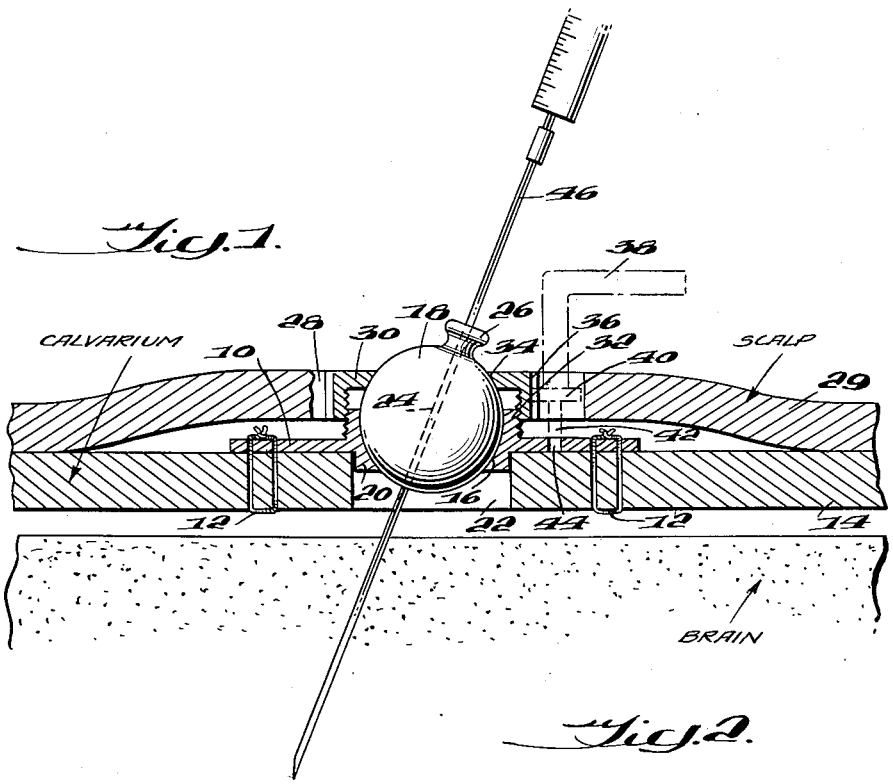
FIGURE 1 is a sectional view illustrating the invention and its use.

Briefly stated, the device of the invention comprises a mounting plate which may be attached to a solid member of the body, such as the skull. The plate has a socket which may be located over an opening formed in the skull and in which is mounted a ball having a passage for the reception of a cannula, needle, or the like. Movement of the ball in the socket permits orientation of the passage with respect to the body, and the mounting plate has means for locking the ball in a chosen orientation.

Referring to the drawings, wherein for explanation the invention is shown employed in neurosurgery, the device of the invention comprises a support in the form of a mounting plate 10, which may be fixed, as by sutures 12, to the skull 14. In the surgical process suitable small openings may be formed in the skull to permit the passage of the sutures 12, the sutures being drawn through aligned openings in the mounting plate 10. The mounting plate 10 has a spherical socket 16 which receives a mating ball 18. The socket 16 has a depending portion 20 which may be inserted in a hole 22 in the skull formed as by a suitable drill. The proper location for the opening 22 may be determined by standard X-ray techniques. The insertion of the depending portion 20 within the opening 22 ensures proper location of the device of the invention with respect to the skull.

The ball 18 has an axial passage 24 which is adapted to receive a cannula, needle, or the like. The ball may be oriented with respect to the brain by grasping the small reference projection 26 formed at the top of the ball, which extends through an incision 28 in the scalp 29.

In order that the ball may be fixed in position when the proper orientation has been selected, a locking ring 30 is threaded onto an upwardly extending boss 32 of the mounting plate 10 as shown. The locking ring has a circular opening 34 through which the top of the ball projects, and the edges of the ring which define this opening may be contoured as shown to match the spherical surface of the ball. If the ring is threaded loosely onto the boss 32, the ball is free to move. When the ring is tightened down onto the boss, the edges of the opening 34 of the ring will bind against the adjacent surface of the ball, locking the ball in position. To permit ready rotation of the ring, the periphery of the ring may be formed with gear teeth 36. As shown by the phantom lines in FIGURES 1 and 2, a small tool 38 formed with a pinion 40 may be employed to rotate the locking ring. The tool is formed with a stub shaft 42 at one end for insertion in a mating bore 44 in the mounting plate 10 to support the tool for rotation with the teeth 36 of the locking ring in engagement with the teeth of the pinion 40.

Figure 2:
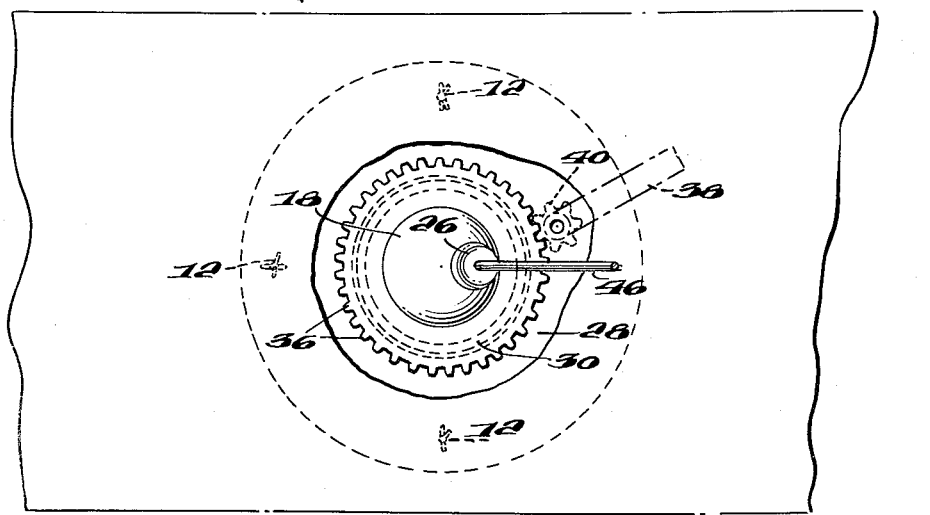
FIGURE 2 is a plan view of the device shown in FIGURE 1.

In using the device of the invention in the exemplary neurosurgical application illustrated the necessary incisions and openings are made in the scalp and the skull, and the device is placed in the position shown in FIGURE 1 and sutured to the skull. The ball 18 may then be moved by means of the reference projection 26 to obtain the approximate desired orientation of the passage 24, and the hypodermic needle 46 or the like may then be partially inserted in the passage and the final orientation determined fluoroscopically. The ball is locked in the chosen position by threading down the ring 30, and the needle 46 is then inserted to the desired depth.

From the foregoing description of the invention it will be apparent that the device of the invention permits simple yet positive orientation of a hypodermic needle, cannula or the like. When the proper orientation has been determined, the device may be locked and will then serve to guide the needle or cannula to the desired region of the body. While a preferred embodiment of the invention has been shown and described, it will be apparent to those skilled in the art that changes can be made in this embodiment without departing from the principles and spirit of the invention, the scope of which is defined in the appended claims. Accordingly, the foregoing embodiment is to be considered illustrative, rather than restrictive of the invention, and those modifications which come within the meaning and range of equivalency of the claims are to be included therein.

The invention claimed is:

1. A device for orienting and guiding a cannula, needle, or the like, through a bone surface of a living body, comprising a mounting plate for positioning over said bone surface, said plate having a spherical socket containing a ball with a passage therethrough adapted to be fixed relative to said plate, one surface of said plate surrounding said socket being substantially planar and adapted for juxtaposition with said bone surface, said plate having openings above and below said socket, said ball having substantial surface portions that surround the ends of said passage protruding through said openings, respectively, the cross dimension of said passage being subtantially less than the correponding cross dimension of said openings, and the ends of said passage being spaced from the margins of said openings, respectively, by said ball surface portions, whereby said ball may be turned in said socket through a wide range of angles while maintaining said passage ends exposed.

2. The device of claim 1, said plate having openings therethrough to receive sutures or the like for attaching the plate to the bone surface.

3. The device of claim 1, the surface of said ball protruding through the upper opening having a reference projection at the corresponding passage end.

4. A device for orienting and guiding a cannula, needle, or the like, through a bone surface of a living body, comprising a mounting plate for positioning over said bone surface, said plate having a spherical socket containing a ball with a passage therethrough, said plate having openings above and below said socket, said ball having substantial surface portions that surround the ends of said passage protruding through said openings, respectively, the cross dimension of said passage being substantially less than the corresponding cross dimension of said openings, and the ends of said passage being spaced from the margins of said openings, respectively, by said ball surface portions, whereby said ball may be turned in said socket through a wide range of angles while maintaining said passage ends exposed, said device further comprising an apertured ring, said ring and said plate having threaded portions for threaded interengagement of the ring around the upper plate opening, the edge of the aperture engaging the adjacent protruding ball surface, to lock the ball in a chosen position.

5. A device for orienting and guiding a cannula, needle, or the like, through a hole in a bone surface of a living body, comprising a mounting plate for positioning over said bone surface, said plate having a spherical socket containing a ball with a passage therethrough adapted to be fixed relative to said plate, said plate having openings above and below said socket, said ball having substantial surface portions that surround the ends of said passage protruding through said openings, respectively, the cross dimension of said passage being substantially less than the corresponding cross dimension of said openings, and the ends of said passage being spaced from the margins of said openings, respectively, by said ball surface portions, said plate having a projection adapted to fit into said bone hole, said lower opening being located in said projection.

References Cited in the file of this patent

UNITED STATES PATENTS

| | | |
|---|---|---|
| 2,008,340 | Salvati et al. | July 16, 1935 |
| 2,200,120 | Nauth | May 7, 1940 |

FOREIGN PATENTS

| | | |
|---|---|---|
| 181,361 | Austria | Mar. 10, 1955 |

OTHER REFERENCES

"The Lancet," August 23, 1958, page 401. (Copy in Scientific Library.)

Cooper and Thomas article, July 30, 1956. (Copy in Division 55, 128–221.)

Cooper, Irving S.: "Neurological Alleviation of Parkinsonism," 1956, pages 72–83, published by C. C. Thomas, Springfield, Ill. (Copy in 128–121, Div. 55.)